(12) United States Patent
Mazoue

(10) Patent No.: US 9,633,077 B2
(45) Date of Patent: Apr. 25, 2017

(54) QUERY OF MULTIPLE UNJOINED VIEWS

(71) Applicant: Didier Mazoue, Issy les Moulineaux (FR)

(72) Inventor: Didier Mazoue, Issy les Moulineaux (FR)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 41 days.

(21) Appl. No.: 13/724,790

(22) Filed: Dec. 21, 2012

(65) Prior Publication Data

US 2014/0181151 A1   Jun. 26, 2014

(51) Int. Cl.
*G06F 7/00* (2006.01)
*G06F 17/30* (2006.01)

(52) U.S. Cl.
CPC .. *G06F 17/30477* (2013.01); *G06F 17/30427* (2013.01); *G06F 17/30607* (2013.01); *G06F 17/30595* (2013.01)

(58) Field of Classification Search
CPC ......... G06F 17/30607; G06F 17/30595; G06F 17/30286; G06F 17/30477; G06F 17/30427; G06Q 10/10; G06Q 10/06
USPC ......................................................... 707/792
See application file for complete search history.

(56) References Cited

U.S. PATENT DOCUMENTS

| | | | | |
|---|---|---|---|---|
| 5,428,776 A | * | 6/1995 | Rothfield | |
| 5,555,403 A | * | 9/1996 | Cambot et al. | |
| 5,765,159 A | * | 6/1998 | Srinivasan | |
| 6,016,488 A | * | 1/2000 | Bosworth et al. | |
| 7,171,427 B2 | * | 1/2007 | Witkowski et al. | |
| 7,191,169 B1 | * | 3/2007 | Tao | G06F 17/30457 707/714 |
| 7,467,152 B2 | * | 12/2008 | Kearsey et al. | |
| 7,809,678 B2 | * | 10/2010 | Berger | G06F 17/30418 707/600 |
| 8,606,803 B2 | * | 12/2013 | Bhatawdekar et al. | 707/759 |
| 2002/0099563 A1 | * | 7/2002 | Adendorff | G06F 17/30563 705/7.11 |
| 2004/0215626 A1 | * | 10/2004 | Colossi | G06F 17/30312 |
| 2004/0236767 A1 | * | 11/2004 | Soylemez | G06F 17/30592 |
| 2005/0015360 A1 | * | 1/2005 | Cras | G06F 17/30398 |
| 2005/0076045 A1 | * | 4/2005 | Stenslet | G06F 17/30592 |
| 2005/0240577 A1 | * | 10/2005 | Larson et al. | 707/3 |
| 2006/0031250 A1 | * | 2/2006 | Henigman | G06F 17/30607 |
| 2006/0253419 A1 | * | 11/2006 | Lin et al. | 707/1 |
| 2007/0100842 A1 | * | 5/2007 | Wykes | G06Q 30/0603 |

(Continued)

*Primary Examiner* — Heather Herndon
*Assistant Examiner* — Lin Lin Htay
(74) *Attorney, Agent, or Firm* — Buckley, Maschoff & Talwalkar LLC

(57) ABSTRACT

A system includes identification of two or more information models of a database schema, where each of the two or more information models includes a plurality of dimensions and a respective measure, and is not joined to any other of the two or more information models, generation, for each of the two or more information models, of an auto join on a dimension included in the information model, reception of an object-based query including one or more objects of the two or more information models, generation of one structured language query for each of the two or more information models, obtaining of a result set for each of the two or more structured language queries, and aggregation of the result sets into an aggregated result set.

12 Claims, 11 Drawing Sheets

(56) References Cited

U.S. PATENT DOCUMENTS

2007/0156734 A1* 7/2007 Dipper et al. ............... 707/101
2007/0208721 A1* 9/2007 Zaman et al. ................. 707/4
2010/0049734 A1* 2/2010 Wintel et al. ............ 707/103 R
2011/0093487 A1   4/2011 Le Biannic et al.

* cited by examiner

Client Application — 600

Objects — 610

- Year
- Quarter
- Product
- Category
- Country
- Warehouse
- Sales
  - Revenue
- Inventory
  - Quantity
- Expenses
  - Amount

Query Objects — 620

[Year] [Revenue] [Quantity] [Amount]

Query Filters — 630

Data Preview — 640

| YEAR | REVENUE | AMOUNT | QUANTITY |
|------|---------|--------|----------|
| 2011 | 100 | 50 | 8 |
| 2012 | 200 | 60 | 14 |

*FIG. 7*

| Client Application | |
|---|---|
| Objects | Query Objects |

Client Application — 600

Objects:
- Year
- Quarter
- Product
- Category
- Country
- Warehouse
- 📁 Sales
  - Revenue
- 📁 Inventory
  - Quantity
- 📁 Expenses
  - Amount

610

Query Objects: Year | Product | Revenue | Quantity

620

Query Filters

630

Data Preview

| YEAR | PRODUCT | REVENUE | QUANTITY |
|---|---|---|---|
| 2011 | FOOD | 60 | 5 |
| 2011 | DRINK | 40 | 3 |
| 2012 | FOOD | 120 | 8 |
| 2012 | DRINK | 80 | 6 |

Client Application — 600

| Objects | Query Objects |
|---|---|
| ◊ Year<br>◊ Quarter<br>◊ Product<br>◊ Category<br>◊ Country<br>◊ Warehouse<br>📁 Sales<br>  ▭ Revenue<br>📁 Inventory<br>  ▭ Quantity<br>📁 Expenses<br>  ▭ Amount<br><br>610 | ◊ Year   ◊ Country   ◊ Product   ◊ Category<br><br>▭ Revenue   ▭ Amount   ▭ Quantity<br>  620 |

Query Filters

630

Data Preview

| YEAR | COUNTRY | PRODUCT | CATEGORY | REVENUE | AMOUNT | QUANTITY |
|---|---|---|---|---|---|---|
| 2011 | USA | Food | | 25 | | |
| 2011 | USA | Drink | | 35 | | |
| 2011 | France | Food | | 10 | | |
| 2011 | France | Drink | | 30 | | |
| 2011 | | Food | | | | 5 |
| 2011 | | Drink | | | | 3 |
| 2011 | | | Actual | | 30 | |
| 2011 | | | Budget | | 20 | |
| 2012 | USA | Food | | 50 | | |
| 2012 | USA | Drink | | 70 | | |
| 2012 | France | Food | | 20 | | |
| 2012 | France | Drink | | 60 | | |
| 2012 | | Food | | | | 8 |
| 2012 | | Drink | | | | 6 |
| 2012 | | | Actual | | 25 | |
| 2012 | | | Budget | | 35 | |

| Client Application | | | | | | | |
|---|---|---|---|---|---|---|---|
| Objects | Query Objects | | | | | | |
| Year | Year | Country | Product | Category | | | |
| Quarter | | | | | | | |
| Product | Revenue | Amount | Quantity | | | | 620 |
| Category | Query Filters | | | | | | |
| Country | | | | | | | |
| Warehouse | Year = 2011 | Country = USA | Category = Actual | | | | 630 |
| Sales | Data Preview | | | | | | |
| Revenue | YEAR | COUNTRY | PRODUCT | CATEGORY | REVENUE | AMOUNT | QUANTITY |
| Inventory | 2011 | USA | Food | | 25 | | |
| Quantity | 2011 | USA | Drink | | 35 | | |
| Expenses | 2011 | | Food | | | | 5 |
| Amount | 2011 | | Drink | | | | 3 |
| | 2011 | | | Actual | | 30 | |
| 610 | | | | | | | 640 |

QUERY OF MULTIPLE UNJOINED VIEWS

BACKGROUND

Business data may be stored within relational database tables. The structures and inter-relationships of the database tables are complex. Business Intelligence (BI) tools therefore use an abstraction layer to shield end users from the complexity of the physical tables. The abstraction layer allows end users to query database tables using intuitive terms rather than requiring the end users to create query language statements which refer to specific entities of the database tables.

A developer may define "information models" intended to represent data needed for a particular business task. To increase system performance and reduce system complexity, a single user-generated query is typically limited to data contained in a single information model. Moreover, since information models are not joined to one another (also due to performance and complexity considerations), a query directed to data of multiple information models would return multiple independent result sets.

BRIEF DESCRIPTION OF THE DRAWINGS

FIG. 7 is a view of a user interface for creating an object-based query and presenting an aggregated result set according to some embodiments.

FIG. 8 is a view of a user interface for creating an object-based query and presenting an aggregated result set according to some embodiments.

FIG. 9 is a view of a user interface for creating an object-based query and presenting an aggregated result set according to some embodiments.

FIG. 10 is a view of a user interface for creating an object-based query and presenting an aggregated result set according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Generally, some embodiments facilitate response to an object-based query including dimensions and measures of unjoined information models within a database schema. More specifically, some embodiments provide a single aggregated result set in response to such an object-based query.

Figure 1:
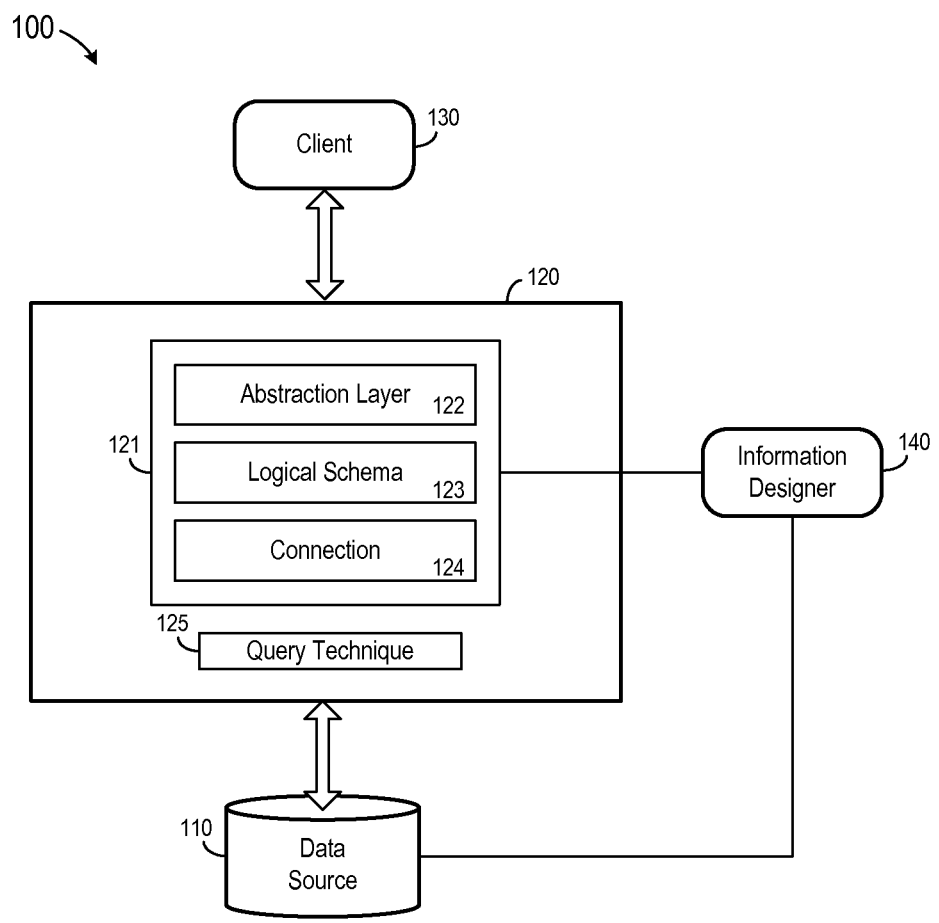
FIG. 1 is a block diagram of a system according to some embodiments.

FIG. 1 is a block diagram of system 100 according to some embodiments. System 100 includes data source 110, server 120, and client 130. Data source 110 may comprise any query-responsive relational data source or sources that are or become known. The data of data source 110 may be distributed among several relational databases. Embodiments are not limited to any number or types of data sources. Data source 110 may comprise a query language server (e.g., a Structured Query Language server) to generate execution plans in response to received query language statements.

In some embodiments, data source 110 is implemented in Random Access Memory (e.g., cache memory for storing recently-used data) and one or more fixed disks (e.g., persistent memory for storing the full database). Alternatively, data source 110 may implement an "in-memory" database, in which volatile (e.g., non-disk-based) memory (e.g., Random Access Memory) is used both for cache memory and for storing the full database. In some embodiments, the data of data source 110 may comprise one or more of row-based tabular data stored in row format, column-based tabular data stored in columnar format, and object-based data. Data source 110 may also or alternatively support multi-tenancy by providing multiple logical database systems which are programmatically isolated from one another. Moreover, the data of data source 110 may be indexed and/or selectively replicated in an index to allow fast searching and retrieval thereof.

The data stored in data source 110 may be generated by planning system and/or received from one or more disparate data sources. These data sources may include data warehouses and sources of enterprise data, including but not limited to accounting, human resources and operations back-end systems.

Server 120 includes universe 121, which in turn includes abstraction layer 122, logical schema 123 and connection 124. Logical schema 123 defines a structure of the data within data source 110, including but not limited to a list of database tables of data source 110, their constituent columns, and joins therebetween. Logical schema 123 also defines information models, which are database tables optimized for retrieving data for particular usage scenarios. As mentioned above, information models of logical schema 123 might not be joined to one another in some embodiments.

Abstraction layer 122 defines a set of abstract entities known as business objects and their mappings to logical entities (i.e., database tables and their columns) of logical schema 123. The business objects may represent business entities, such as customers, time periods, financial figures, etc. Business objects may be classified as dimension objects along which one may want to perform an analysis or report (e.g., Year, Country, Product), and measure objects (e.g., Sales, Profit) whose values can be determined for a given combination of dimension values.

For each of the dimension objects, abstraction layer 122 may specify a relational table of data source 110 associated with the dimension object, and one or more column names of the relational table associated with the dimension object. For each of the measure objects, abstraction layer 122 may specify a relational table associated with the measure object, one or more column names of the relational table associated with the measure object, and an aggregation method (e.g., SUM) associated with the measure object.

Information designer 140 may comprise hardware and/or software used to generate and/or edit logical schema 123. Information designer 140 may also be used to generate and/or edit abstraction layer 122 according to some embodiments.

Connection 124 includes information for communicating with data source 110, while query technique 125 generates query language (e.g., SQL) statements based on received object-based queries and information from universe 121.

Client 130 may comprise one or more devices executing program code of a software application for presenting user interfaces to allow interaction with server 120. Presentation of a user interface may comprise any degree or type of rendering, depending on the type of user interface code generated by server 120. For example, client 130 may execute a Web Browser to receive a Web page (e.g., in HTML format) from server 120, and may render and present the Web page according to known protocols. Client 130 may also or alternatively present user interfaces by executing a standalone executable file (e.g., an .exe file) or code (e.g., a JAVA applet) within a virtual machine.

Generally, client 130 generates object-based queries based on the business objects of abstraction layer 122. Abstraction layer 122 therefore facilitates the retrieval of data from data source 110 without requiring reference to specific physical entities (tables, rows, etc.) of data source 110.

According to some embodiments, server 120 receives an object-based query from client 130 which includes objects associated with two or more information models of logical schema 123. Server 120 then creates two or more corresponding SQL statements based on the mappings which bind objects of abstraction layer 122 to the entities of logical schema 123, and based on other information as described herein.

Data source 110 executes a query plan corresponding to the two or more SQL statements and returns two or more corresponding result sets. Server 140 receives and aggregates the result sets, and provides the aggregated result set to client 130.

Figure 2:
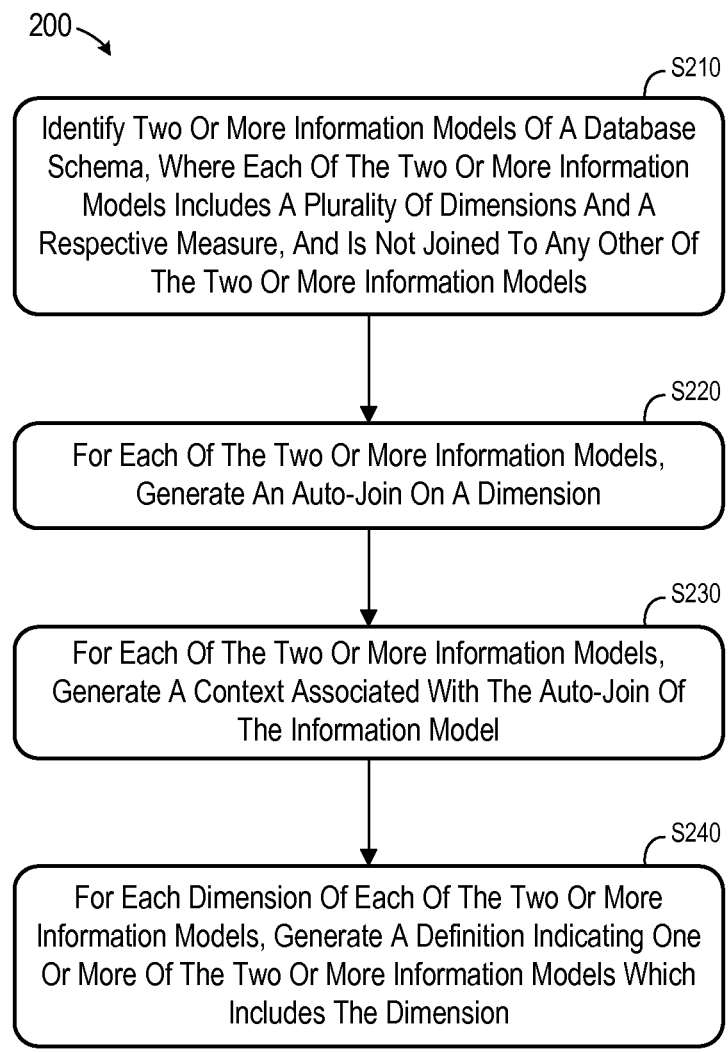
FIG. 2 is a flow diagram of a process according to some embodiments.

FIG. 2 comprises a flow diagram of process 200 according to some embodiments. In some embodiments, various hardware elements of server 120 execute program code to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Two or more information models of a database schema are identified at S210. Each of the two or more information models includes a plurality of dimensions and a respective measure. Moreover, none of the two or more information models is joined to any other of the two or more information models. With reference to system 100, logical schema 123 does not define any logical joins between any of the two or more information models.

An information model may be characterized as a table in which the columns thereof correspond to objects which have been selected and defined with regard to a particular usage scenario. The objects of an information model may correspond to columns of different database tables of the underlying logical schema. As mentioned above, many systems limit object-based queries to objects of a single information model, and do not allow or recommend joins between information model. Accordingly, users are typically limited to information model-specific result sets.

Figure 3:
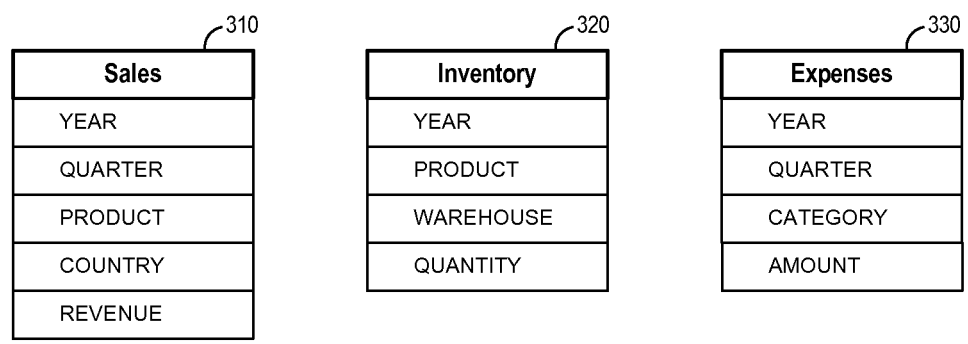
FIG. 3 illustrates information models of a database schema according to some embodiments.

FIG. 3 illustrates information models which are identified at S210 according to some embodiments. The information models are not joined to one another and are each defined as a table in logical schema 123. Sales model 310 specifies four dimensions and the measure Revenue, Inventory model 320 specifies three dimensions and the measure Quantity, and Expenses model 330 specifies three dimensions and the measure Amount. Each model shares some dimensions with the other model and includes one or more dimensions that are not included in the other models.

At S220, an auto join is generated on a dimension for each of the two or more models. Next, at S230, a context is generated for each of the two or more models. The context generated for a model is associated with the auto join generated for that model at S220. According to some embodiments, query technique 125 supports the ability to run one query per context. Therefore, by generating a context for each of model 310-330, query technique 125 is able to run one query per model. Since contexts are a collection of joins, the auto joins are generated at S220 in order to define the contexts based thereon.

The auto joins and contexts are generated and stored in logical schema 123, perhaps using information designer 140. With specific reference to model 310-330, the auto join for Sales model 310 may comprise: SALES.YEAR=SALES.YEAR, the auto-join for Inventory model 320 may comprise: INVENTORY.YEAR=INVENTORY.YEAR, and the auto join for Expenses model 330 may comprise: EXPENSES.YEAR=EXPENSES.YEAR. As shown, the auto joins are defined on the same dimension (i.e., YEAR). The Sales context, Inventory context and Expenses context generated at S230 therefore include "SALES.YEAR=SALES.YEAR", "INVENTORY.YEAR=INVENTORY.YEAR", and "EXPENSES.YEAR=EXPENSES.YEAR", respectively.

A definition is then generated at S240 for each dimension of each of the two or more identified information models. The definition for a dimension indicates those of the two or more identified information models which include that dimension. As will be described below, the definitions may facilitate the generation of appropriate SQL statements based on a single object-based query, as well as aggregation of multiple result sets returned from the SQL statements. Query technique 125 may also support the use of these definitions in this manner.

Figure 4:
FIG. 4 depicts object definitions for aggregation of individual result sets according to some embodiments.

FIG. 4 illustrates definitions generated at S240 according to the present example. Only one definition is created per dimension, even if a dimension is shared among several of the identified information models. The definitions are generated in abstraction layer 122 according to some embodiments, for example by information designer 140.

As shown in FIG. 4, definitions 320 indicate the information models columns (i.e., as table.column) which correspond to each dimension of objects 310. As will be described below, these definitions facilitate the generation of SQL statements for each of the two or more information models which return the same number of dimensions, so that the result sets may be easily aggregated.

Figure 5:
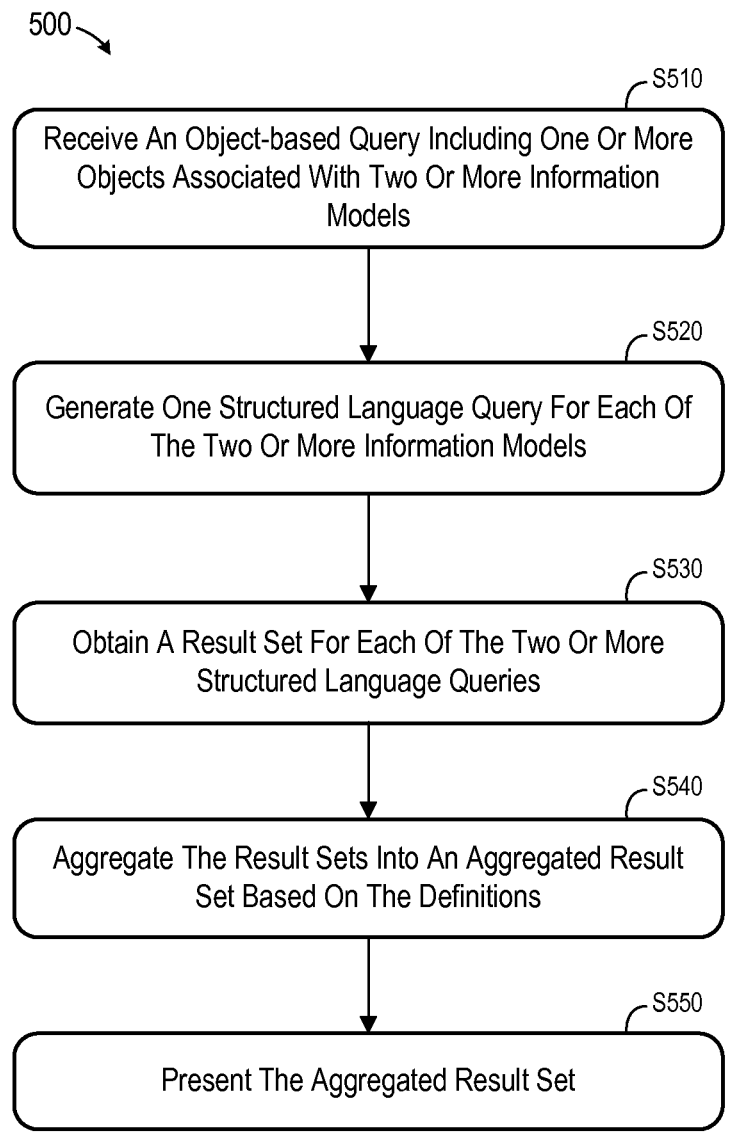
FIG. 5 is a flow diagram of a process according to some embodiments.

FIG. 5 is a flow diagram of process 500 according to some embodiments. Process 500 may be executed at runtime while process 200 may be executed at design time. Process 500 may utilize the constructs generated at process 200, therefore the below-described example of process 500 will continue the example set forth with respect to process 200.

Initially, an object-based query is received at S510. In the examples provided below, the query includes one or more objects associated with two or more information models. For example, the object-based query may include dimensions of two or more information models and/or measures of two or more information models.

Figure 6:
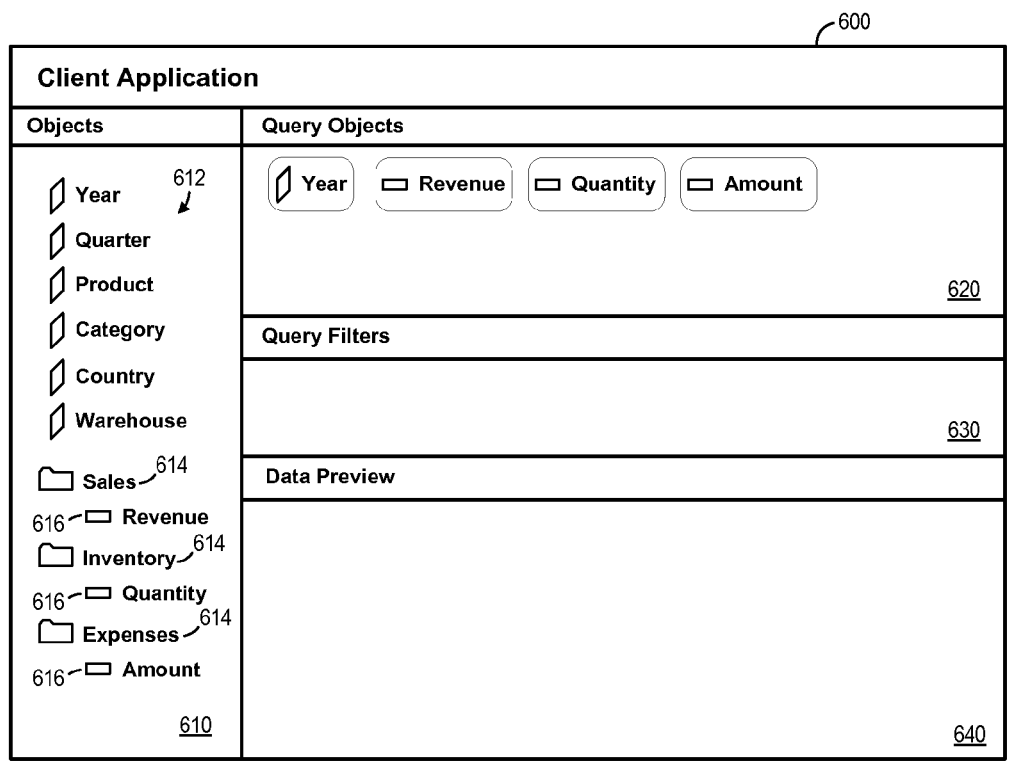
FIG. 6 is a view of a user interface for creating an object-based query according to some embodiments.

FIG. 6 illustrates interface 600 for creating object-based queries according to some embodiments. Interface 600 may be presented to a user by client 130, via a Web Browser window or a window of a dedicated application.

Object pane 610 of interface 600 includes icons representing dimensions 612 and views 614. Under each view 614 is an icon representing the measure 616 associated with that view 614. According to the present example, dimensions 612 include each dimension of views 614 (i.e., of tables 310-330) and no other dimensions.

To create an object-based query, a user drags icons of object pane 610 representing dimensions or measures into query pane 620. Query pane 620 of FIG. 6 shows the dimension Year and the measures Revenue, Quantity and Amount. It will be assumed that this query is received by server 120 at S510.

At S520, one structured language query is generated for each of the two or more information models whose measures are included in the object-based query. The measures Revenue, Quantity and Amount are associated with the Sales, Inventory and Expenses models, therefore one structured language query is generated at S520 for each of the Sales, Inventory and Expenses models.

The structured language queries are generated based on definitions indicating which of the two or more information models includes each of the one or more dimensions of the query. These definitions were described above with respect to S240 and FIG. 4. According to the present example, definitions indicate that each of the Sales, Inventory and Expenses models include the Year dimension. The definitions also indicate the column of each model which corresponds to the Year dimension. A structured language query for each model is therefore generated to select the column and the respective measure from the model. For example:

---
SQL 1
---
SELECT SALES.YEAR, sum(SALES.REVENUE)
FROM SALES
WHERE SALES.YEAR = SALES.YEAR
GROUP BY SALES.YEAR
SQL 2
---
SELECT EXPENSES.YEAR, sum(EXPENSES.AMOUNT)
FROM EXPENSES
WHERE EXPENSES.YEAR = EXPENSES.YEAR
GROUP BY EXPENSES.YEAR
SQL 3
---
SELECT INVENTORY.YEAR, sum(INVENTORY.QUANTITY)
FROM INVENTORY
WHERE INVENTORY.YEAR = INVENTORY.YEAR
GROUP BY INVENTORY.YEAR
---

As mentioned above, the queries may be generated by query technique 125 at S520.

A result set is obtained for each query at S530. Each result set includes a Year column and a column corresponding to one of the measures (i.e., Revenue, Amount, Quantity). The result sets are aggregated at S540 based on the definitions. Continuing the present example, it is determined that each queried model includes all of the dimensions of the object-based query. Therefore the rows of the result sets may be combined where all the dimension values are equal.

For example, it will be assumed that each of the result sets includes a row in which YEAR=2011 and a row in which YEAR=2012. Therefore, the measure values of each result set may be combined into a single YEAR=2011 row and a single YEAR=2012 row. FIG. 7 illustrates presentation of such an aggregated result in result pane 640 at S550.

The examples provided herein specify queries including one or more dimensions of two or more information models and a respective measure of each of two or more information models. If a received query includes one or more dimensions of two or more information models and no measures, the previously-defined contexts are used as shown in the SQL statements above to obtain and aggregate result sets in a manner which avoids Cartesian products.

Some embodiments also support object-based queries including one or more objects of a single information model. In response to such queries, these embodiments may generate a single SQL statement and result set as is known in the art.

Pane 630 allows a user to define column filters according to some embodiments. For example, in a case that a user defines the filter YEAR=2011 in pane 640, the above SQL queries are altered to include this filter if the table of the query includes the filter column. Since, according to definitions 320, all of the models of the example include the column YEAR, SQL1, SQL2 and SQL3 would be generated at S520 to include AND SALES.YEAR=2011, AND EXPENSES.YEAR=2011, and AND INVENTORY.YEAR=2011 in their respective WHERE clauses. The aggregated result would include only the "2011" row shown in pane 640 of FIG. 7.

FIG. 8 provides another example of an object-based query that may be received at S510 according to some embodiments. The query includes the Year and Product dimensions and the Revenue and Quantity measures. Based on these measures, structured language queries are generated at S520 for the Sales and Inventory models.

Definitions 320 indicate that both the Sales and Inventory models include the Year and Product dimensions. Accordingly, generation of the structured language queries at S520 proceeds similarly to the example above:

---
SQL 1
---
SELECT SALES.YEAR, SALES.PRODUCT, sum(SALES.REVENUE)
FROM SALES
WHERE SALES.YEAR = SALES.YEAR
GROUP BY SALES.YEAR, SALES.PRODUCT
SQL 2
---
SELECT INVENTORY.YEAR, INVENTORY.PRODUCT,
    sum(INVENTORY.QUANTITY)
FROM INVENTORY
WHERE INVENTORY.YEAR = INVENTORY.YEAR
GROUP BY INVENTORY.YEAR, INVENTORY.PRODUCT
---

A result set is obtained for each query at S530. Each result set includes a Year column, a Product column and a column corresponding to either Revenue or Quantity. The result sets are aggregated at S540 based on a determination that each queried model includes all of the dimensions of the object-based query. Therefore, as in the FIG. 7 example, the rows of the result sets may be combined where all the dimension values are equal. FIG. 8 illustrates presentation of the aggregated result set of this example at S550.

Next, it will be assumed that the object-based query of FIG. 9 is received at S510. The query includes the Year, Country, Product and Category dimensions and the Revenue, Amount and Quantity measures. Based on these measures, structured language queries are generated at S520 for the Sales, Expenses and Inventory models.

The queries are generated as described above. However, in a case that a queried model does not include a dimension of the query (as determined from definitions 320), the SELECT statement of the query generated for that model includes a NULL in place of the "missing" dimension. This ensures that all of the returned result sets include a same number of columns, thereby facilitating their aggregation.

For example, definitions 320 indicate that the Sales model does not include a column corresponding to the Category dimension, therefore the associated generated query reads as follows:

| SQL 1 |
| --- |
| SELECT SALES.YEAR, SALES.COUNTRY, SALES.PRODUCT, NULL,    sum(SALES.REVENUE) FROM SALES WHERE SALES.YEAR = SALES.YEAR GROUP BY SALES.YEAR, SALES.COUNTRY, SALES.PRODUCT |

Similarly, definitions 320 indicate that the Expenses model does not include columns corresponding to the Product or Country dimensions, resulting in:

| SQL 2 |
| --- |
| SELECT EXPENSES.YEAR, NULL, NULL, EXPENSES.CATEGORY,    sum(EXPENSES.AMOUNT) FROM EXPENSES WHERE EXPENSES.YEAR = EXPENSES.YEAR GROUP BY EXPENSES.YEAR, EXPENSES.CATEGORY |

Definitions 320 also indicate that the Inventory model does not include columns corresponding to the Country or Category dimensions, resulting in:

| SQL 3 |
| --- |
| SELECT INVENTORY.YEAR, NULL, INVENTORY.PRODUCT, NULL,    sum(INVENTORY.QUANTITY) FROM INVENTORY WHERE INVENTORY.YEAR = INVENTORY.YEAR GROUP BY INVENTORY.YEAR, INVENTORY.PRODUCT |

Result sets of each structured query are obtained at S530. In the present example, each result set will include rows populated with the measure values of the queried model and with dimension values of only those dimensions of the object-based query which exist in the queried model. Columns associated with other measures and dimensions of the object-based query will be unpopulated.

More specifically, rows returned from SQL1 will include values for Year, Country, Product and Revenue, rows returned from SQL2 will include values for Year, Category and Amount, and rows returned from SQL3 will include values for Year, Product and Quantity.

The result sets are aggregated at S540. Since none of the result sets include identical dimensions, the aggregation simply consists of appending the result sets to one another as shown in FIG. 9. The populated measure column of each row indicates the table from which the row's data was obtained.

FIG. 10 illustrates another object-based query according to some embodiments. The query includes the same objects as the query of FIG. 9, but also includes three filters shown in pane 630.

Structured language queries are generated at S520 as described in the prior example, but with the inclusion of the filters where appropriate. In this regard, a structured language query for a particular model includes a filter on a dimension as specified in the object-based query only if the dimension is included in the model. Again, definitions 320 are used to determine if a filtered dimension is included in a particular table. In some embodiments, if a filtered dimension is not included in any of the two or more information models associated with the objects of the query, the filter is not included in any of the structured language queries generated at S520.

In the present example, the Sales model includes the filtered dimensions Year and Country, the Expenses model includes the filtered dimensions Year and Category, and the Inventory model includes only the filtered dimension Year. Therefore, three queries are generated at S530 as follows:

| SQL1 |
| --- |
| SELECT SALES.YEAR, SALES.COUNTRY, SALES.PRODUCT, NULL,    sum(SALES.REVENUE) FROM SALES WHERE SALES.YEAR = SALES.YEAR AND SALES.YEAR = 2011 AND SALES.COUNTRY = 'USA' GROUP BY SALES.YEAR, SALES.COUNTRY, SALES.PRODUCT |
| SQL 2 |
| SELECT EXPENSES.YEAR, NULL, NULL, EXPENSES.CATEGORY,    sum(EXPENSES.AMOUNT) FROM EXPENSES WHERE EXPENSES.YEAR = EXPENSES.YEAR AND EXPENSES.YEAR = 2011 AND EXPENSES.CATEGORY = 'Actual' GROUP BY EXPENSES.YEAR, EXPENSES.CATEGORY |
| SQL 3 |
| SELECT INVENTORY.YEAR, NULL, INVENTORY.PRODUCT, NULL,    sum(INVENTORY.QUANTITY) FROM INVENTORY WHERE INVENTORY.YEAR = INVENTORY.YEAR AND INVENTORY.YEAR = 2011 GROUP BY INVENTORY.YEAR, INVENTORY.PRODUCT |

The aggregated results are shown in FIG. 10, in which the first two rows are the result set returned from SQL 1, the third and fourth rows are the result set returned from SQL 2, and the fifth row is the result set returned from SQL 3.

Figure 11:
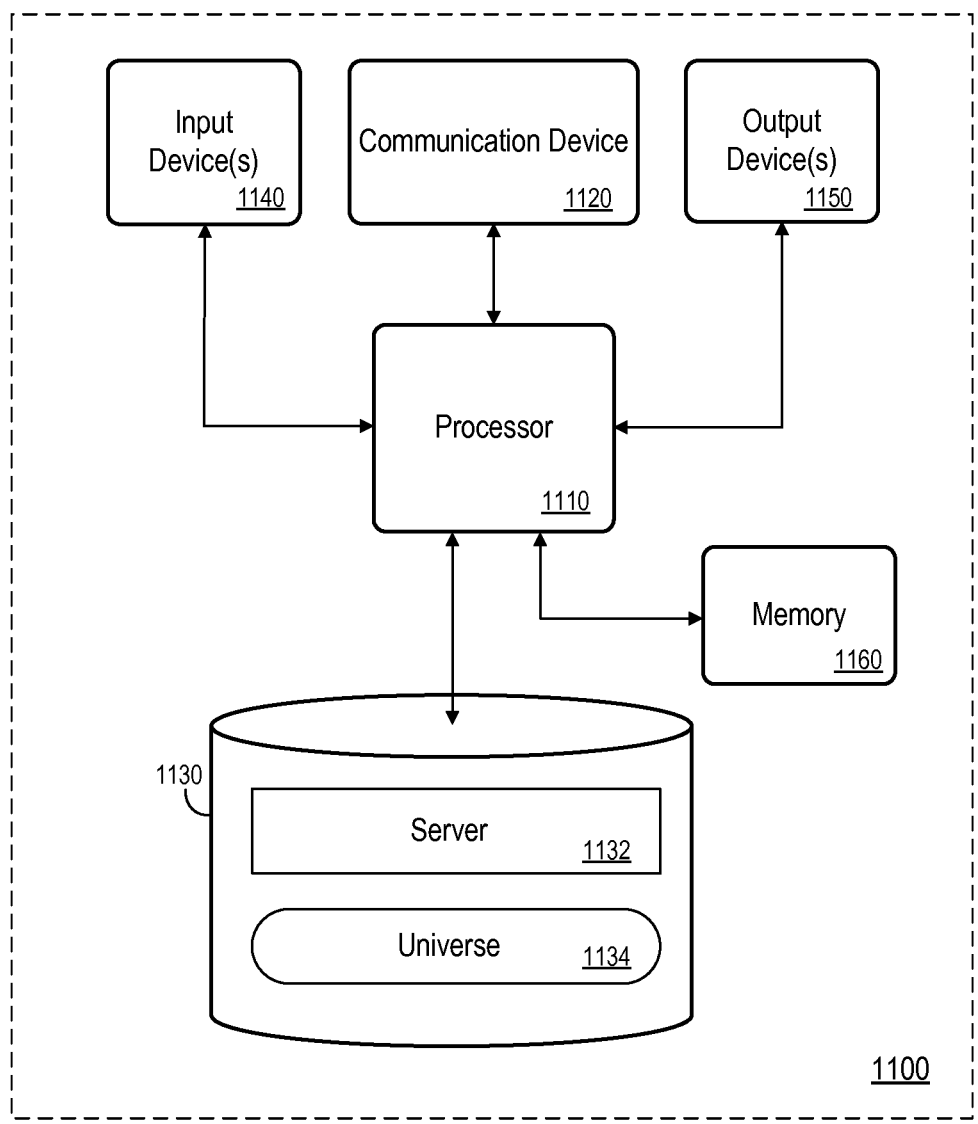
FIG. 11 is a block diagram of an apparatus according to some embodiments.

FIG. 11 is a block diagram of apparatus 1100 according to some embodiments. Apparatus 1100 may comprise a general-purpose computing apparatus and may execute program code to perform any of the processes described herein. Apparatus 1100 may comprise an implementation of server 120, of server 120 and data source 110, or of the entirety of system 100. Apparatus 1100 may include other unshown elements according to some embodiments.

Apparatus 1100 includes processor 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Server 1132 may comprise program code executed by processor 1110 to cause apparatus 1100 to perform any one or more of the processes described herein. Embodiments are not limited to execution of these processes by a single apparatus. Universe 1134 may implement universe 121 as described above. As also described above, data source 110 may be implemented in volatile memory such as memory 1160. Data storage device 1130 may also store data and other program code for providing additional functionality and/or which are necessary for operation of apparatus 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable program code; and
   a processor to execute the processor-executable program code in order to cause the computing device to:
   identify from a plurality of information models (i) a first information model of a database schema comprising a first dimension and a second dimension and (ii) a second information model of the database schema comprising a third dimension and a fourth dimension, where the first information model and the second information model are not joined to remaining information models;
   generate an auto-join query language statement on the first dimension of the first information model and the third dimension of the second information model, based on the first dimension and the third dimension being identical, where each auto-join is defined on an identical dimension;
   generate, for each dimension, a definition indicating each of the information models that includes the dimension, and a column defined by each of the information models which corresponds to the dimension;
   receive the auto-join query language statement including the first dimension of the first information model and the third dimension of the second information model;
   generate a structured language query for each of the information models based on the generated definitions indicating the first information model wherein in a case that the first informational model does not include an identical dimension with the remaining information models, include a NULL in place of a missing dimension in a SELECT statement of the structured language query generated for the first information model so that a returned result set includes a same number of columns;
   obtain a plurality of result sets, one for each of the structured language queries;
   determine at least one or more rows from each of result sets having identical dimension values;
   aggregate the rows from each of the result sets having identical dimension values into a single row in an aggregated result set;
   and present the single rows.

2. A system according to claim 1, wherein generation of one structured language query for one of the information models comprises:
   identification of one of the one or more dimensions which the one information model does not include; and
   inclusion of a NULL in the SELECT clause of the one structured language query for each of the dimensions which the one information model does not include.

3. A system according to claim 1, wherein the object-based query includes a filter on a dimension, and wherein generation of one structured language query for each of the information models comprises:
   determination of whether one of the information models includes the dimension; and
   in a case that one of the information models includes the dimension, inclusion of the filter in the structured language query for the one of the two or more information models.

4. A system according to claim 1, wherein the object-based query includes one or more dimensions and two or more measures,
   wherein each of the single rows includes a value of each of the two or more measures.

5. A non-transitory computer-readable medium storing program code, the program code executable by a processor of a computing system to cause the computing system to:
   identify from a plurality of information models (i) a first information model of a database schema comprising a first dimension and a second dimension and (ii) a second information model of the database schema comprising a third dimension and a fourth dimension, where the first information model and the second information model are not joined to remaining information models;
   generate an auto-join query language statement on the first dimension of the first information model and the third dimension of the second information model, based on the first dimension and the third dimension being identical, where each auto-join is defined on an identical dimension;

generate, for each dimension, a definition indicating each of the information models that includes the dimension, and a column defined by each of the information models which corresponds to the dimension;

receive the auto-join query language statement including the first dimension of the first information model and the third dimension of the second information model;

generate a structured language query for each of the information models based on the generated definitions indicating the first information model wherein in a case that the first informational model does not include an identical dimension with the remaining information models, include a NULL in place of a missing dimension in a SELECT statement of the structured language query generated for the first information model so that a returned result set includes a same number of columns;

obtain a plurality of result sets, one for each of the structured language queries;

determine at least one or more rows from each of result sets having identical dimension values;

aggregate the rows from each of the result sets having identical dimension values into a single row in an aggregated result set;

and present the single rows.

6. A medium according to claim 5, wherein generation of one structured language query for one of the information models comprises:

identification of one of the one or more dimensions which the one information model does not include; and inclusion of a NULL in the SELECT clause of the one structured language query for each of the dimensions which the one information model does not include.

7. A medium according to claim 5, wherein the object-based query includes a filter on a dimension, and wherein generation of one structured language query for each of the information models comprises:

determination of whether one of the information models includes the dimension; and in a case that one of the information models includes the dimension, inclusion of the filter in the structured language query for the one of the two or more information models.

8. A medium according to claim 5, wherein the object-based query includes one or more dimensions and two or more measures, wherein each row of the single rows includes a value of each of the two or more measures.

9. A computer-implemented method comprising:

identifying from a plurality of information models (i) a first information model of a database schema comprising a first dimension and a second dimension and (ii) a second information model of the database schema comprising a third dimension and a fourth dimension, where the first information model and the second information model are not joined to remaining information models;

generating an auto-join query language statement on the first dimension of the first information model and the third dimension of the second information model, based on the first dimension and the third dimension being identical, where each auto-join is defined on an identical dimension;

generating, for each dimension, a definition indicating each of the information models that includes the dimension, and a column defined by each of the information models which corresponds to the dimension;

receiving the auto-join query language statement including the first dimension of the first information model and the third dimension of the second information model;

generating a structured language query for each of the information models based on the generated definitions indicating the first information model wherein in a case that the first informational model does not include an identical dimension with the remaining information models, include a NULL in place of a missing dimension in a SELECT statement of the structured language query generated for the first information model so that a returned result set includes a same number of columns;

obtaining a plurality of result sets, one for each of the structured language queries;

determining at least one or more rows from each of result sets having identical dimension values;

aggregating the rows from each of the result sets having identical dimension values into a single row in an aggregated result set;

and presenting the single rows.

10. A method according to claim 9, wherein generating one structured language query for one of the information models comprises:

identifying one of the one or more dimensions which the one information model does not include; and including a NULL in the SELECT clause of the one structured language query for each one of the dimensions which the one information model does not include.

11. A method according to claim 9, wherein the object-based query includes a filter on a dimension, and wherein generating one structured language query for each of the information models comprises:

determining whether one of the information models includes the dimension; and in a case that one of the information models includes the dimension, inclusion of the filter in the structured language query for the one of the two or more information models.

12. A method according to claim 9, wherein the object-based query includes one or more dimensions and two or more measures, wherein each row of the single rows includes a value of each of the two or more measures.

* * * * *